Oct. 26, 1943.  T. S. BRISKIN ET AL  2,332,693
MAGAZINE EJECTOR FOR CAMERAS
Original Filed Nov. 10, 1941
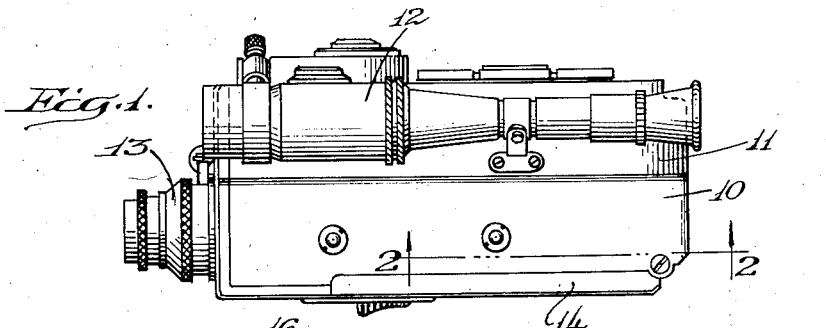
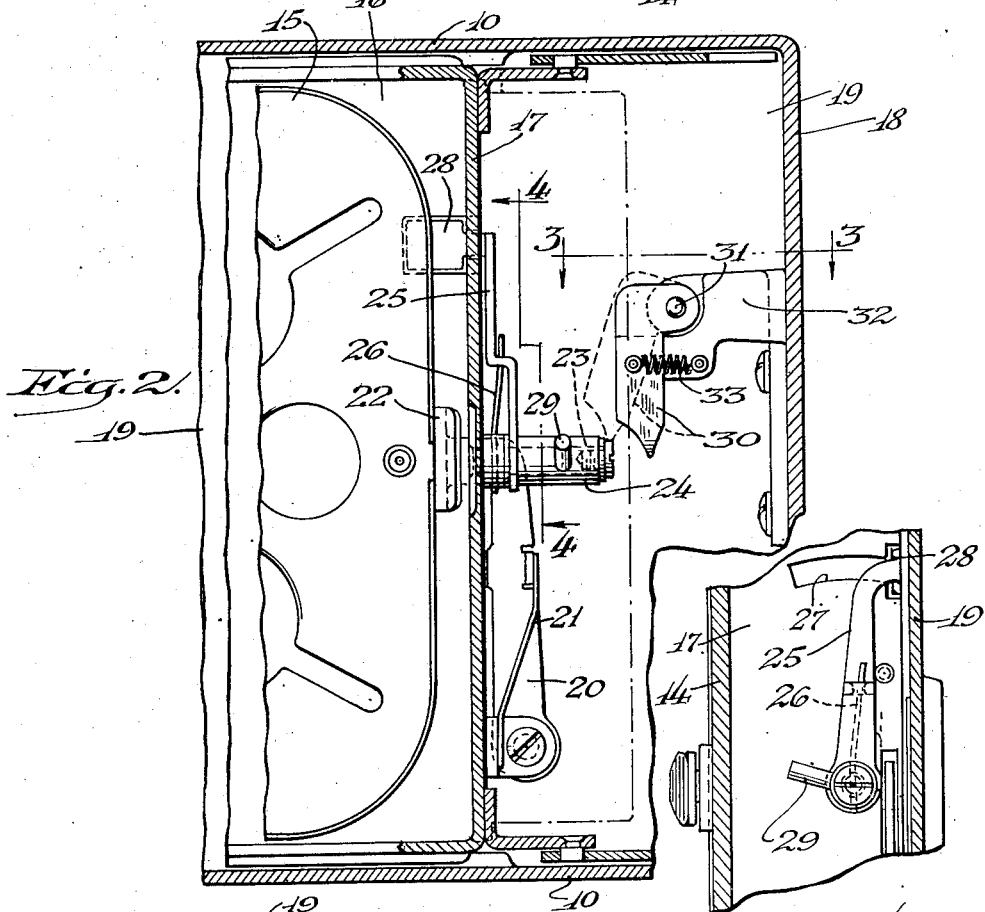
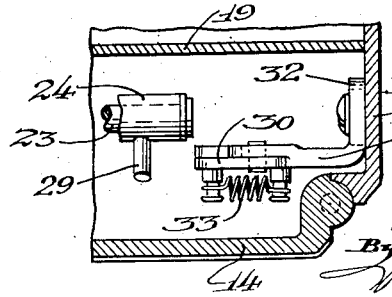
Inventors:
Theodore S. Briskin,
Philmore F. Sperry, deceased,
Helen B. Sperry, Executrix
By Jabel, Carlson, Gritzbaugh & Wells
Attorneys.

Patented Oct. 26, 1943

2,332,693

UNITED STATES PATENT OFFICE 2,332,693

MAGAZINE EJECTOR FOR CAMERAS

Theodore S. Briskin, Chicago, Ill., and Philmore F. Sperry, deceased, late of Chicago, Ill., by Helen B. Sperry, executrix, Chicago, Ill., assignors to Revere Camera Company, Chicago, Ill., a corporation of Delaware Original application November 10, 1941, Serial No. 418,526. Divided and this application November 25, 1942, Serial No. 466,863

9 Claims. (Cl. 88—17)

This application is being filed as a division of the co-pending application of Philmore F. Sperry and Theodore S. Briskin, Serial No. 418,526, filed November 10, 1941. The invention relates to motion picture cameras of the type in which a film is mounted in the camera in a lightproof magazine, having a shutter closing an exposure opening at the front face of the magazine, such magazine being supported in the camera chamber by means of a carrier which is movable forwardly and backwardly in the chamber. In this type of construction, the magazine is inserted into the carrier so as to be held fairly tightly by the carrier, and means is provided for pressing the magazine accurately into the desired operative position with respect to the lens system of the camera.

It is the principal object of this invention to provide an improved arrangement of means for releasing the magazine from the grip of the carrier when the magazine is to be removed from the camera. In the preferred arrangement, means is provided actuated by the backward movement of the carrier for releasing the magazine therefrom. In this preferred arrangement the actuation of the magazine releasing means is automatically brought about when the carrier reaches the backward limit of its movement in the camera.

It is another object of the invention to improve devices of this type in sundry details hereinafter pointed out. The preferred means by which the several objects have been attained are illustrated in the accompanying drawing, in which—

Fig. 1 is a top plan view of a camera embodying the invention;

Fig. 2 is a vertical sectional view taken upon a considerably enlarged scale substantially at the line 2—2 of Fig. 1;

Fig. 3 is a horizontal sectional view taken substantially at the line 3—3 of Fig. 2; and Fig. 4 is a vertical sectional view taken substantially at the line 4—4 of Fig. 2.

In the drawing, 10 indicates the portion of a camera casing at the side of the camera at which the film is mounted and advanced step by step for exposure, the casing being completed by a complementary casing portion 11 at the opposite side. A view finder 12 of any suitable type is mounted on the top face of the casing portion 11. At its front face, the casing portion 10 is provided with a lens system 13 of any suitable type for exposure of a film therethrough. The casing portion 10 is closed at its side face by means of a door 14 pivotally mounted on a vertical axis at the rear edge of the door. A film magazine 15 of well-known type is mounted in the chamber provided by the casing portion 10 by means of a carrier 16 in the form of a drawer slidable forwardly and backwardly within the chamber. For convenience of reference thereto, the rear wall of the carrier is indicated by the numeral 17, and the rear wall of the casing portion 10 is indicated by the numeral 18. The casing portions 10 and 11 are separated from each other by means of a partition 19, as is clearly shown in Fig. 3.

In the arrangement shown, an arm 20 is pivotally mounted on the rear face of the wall 17 upon a transversely positioned axis, a heavy spring 21 being provided for pressing the arm forwardly toward the left in Fig. 2. At its upper end portion, the arm 20 is provided with a pressure plate 22 adapted to engage the magazine 15 for pressing it forwardly in the carrier 16.

The means for automatically releasing the magazine 15 from the grip of the carrier 16 and the spring-pressed arm 20 comprises a post 23 extending backwardly from the rear wall portion 17 of the carrier, having a sleeve 24 rotatably mounted thereon, with an arm 25 rising from the sleeve adjacent to the wall portion 17. A spring 26 bears upon the arm 25, serving normally to hold the arm swung to the limit of its motion toward the partition 19. The arm 25 is bent forwardly at its upper end so as to extend through an arc-shaped slot 27 in the rear wall 17 of the carrier, being provided with a head portion 28 movable transversely of the carrier upon a swinging movement of the arm. The sleeve 24 is provided with a pin 29 extending transversely therefrom into position to engage the end of a bearing member 30 in the form of an arm pivotally mounted by means of a pin 31 carried by a bracket 32 extending forwardly from the rear wall 18 of the casing portion 10. The lower end of the arm 30 is obliquely disposed and stands in position to engage the pin 29 upon the backward movement of the carrier 16. When the pin 29 engages the beveled end of the arm 30 upon a backward movement of the carrier 16 (towards the right in Fig. 2), the arm 30 has a camming action upon the pin so as to force the pin downwardly, serving thus to move the ejector arm 25 and the head 28 transversely for forcing the magazine 15 out of its gripped engagement with the carrier 16. If the pin 29 attains a position to the rear of the point of the arm 30, upon the next following forward movement of the carrier the pin 29 forces the arm forwardly upon its pivotal axis 31 against the action of a coiled spring 33 which normally holds the arm 30 in its rearmost position.

In operation, when the carrier 16 is moved backwardly to the limit of its motion, the arm 25 is given an operative stroke sidewise by the engagement of the pin 29 with the arm 30 so as to have the effect of releasing the magazine from the grip of the carrier when the carrier reaches its rearmost position.

While we prefer to employ the form and arrangement of parts as above described, it is to be understood that our invention is not limited strictly thereto except so far as the claims may be so limited, since changes might well be made in the form and arrangement of the parts without departing from the spirit of the invention.

We claim:

1. In a magazine type motion picture camera, the combination of a casing, lens means operatively mounted in said casing, a magazine carrier movable in said casing toward and from said lens means for gripping a magazine and moving it into and out of operative position with respect to said lens means, and means actuated by the backward movement of said carrier for applying pressure on the magazine for moving it out of the grip of the carrier.

2. In a magazine type motion picture camera, the combination of a casing, lens means operatively mounted in said casing, a magazine carrier movable in said casing toward and from said lens means for gripping a magazine and moving it into and out of operative position with respect to said lens means, an arm pivotally mounted on said carrier in position to engage said magazine upon an operative swinging stroke of the arm so as to apply pressure on the magazine for giving it at least an initial movement out of position in the carrier, and means actuated by a backward movement of the carrier for giving said arm an operative stroke.

3. In a magazine type motion picture camera, the combination of a casing, lens means operatively mounted in said casing, a magazine carrier movable in said casing toward and from said lens means for gripping a magazine and moving it into and out of operative position with respect to said lens means, an ejector member movably mounted in position and arranged so as to engage said magazine upon an operative stroke of said member and to apply pressure on the magazine for releasing it from the grip of the carrier, and means actuated by a backward movement of the carrier to the limit of its movement for giving said member an operative stroke.

4. In a magazine type motion picture camera, the combination of a casing, lens means operatively mounted in said casing, a magazine carrier movable in said casing toward and from said lens means for gripping a magazine and moving it into and out of operative position with respect to said lens means, an arm pivotally mounted in position and arranged so as to engage said magazine upon an operative swinging stroke of the arm and to apply pressure on the magazine for releasing it from the grip of the carrier, and means actuated by the backward movement of the carrier to the limit of its motion for giving said arm an operative swinging stroke.

5. In a magazine type motion picture camera, the combination of a casing, lens means operatively mounted in said casing, a magazine carrier movable in said casing toward and from said lens means for gripping a magazine and moving it into and out of operative position with respect to said lens means, an arm pivotally mounted on said carrier so as to swing transversely thereon in position to engage said magazine upon an operative stroke of the arm for applying pressure sidewise on the magazine for releasing it from the grip of the carrier, yielding means normally holding said arm out of pressure relationship to said magazine, and means actuated by the backward movement of the carrier for giving said arm an operative stroke.

6. In a magazine type motion picture camera, the combination of a casing, lens means operatively mounted in said casing, a magazine carrier movable in said casing toward and from said lens means for gripping a magazine and moving it into and out of operative position with respect to said lens means, an arm pivotally mounted on said carrier in position to engage said magazine upon an operative swinging stroke of the arm so as to apply pressure on the magazine for releasing it from the grip of the carrier, and means adapted by a camming action on said arm when said carrier is moved backwardly to give said arm an operative stroke for releasing said magazine.

7. In a magazine type motion picture camera, the combination of a casing, lens means operatively mounted in said casing, a magazine carrier movable in said casing toward and from said lens means for gripping a magazine and moving it into and out of operative position with respect to said lens means, an arm pivotally mounted on said carrier in position to engage said magazine upon an operative swinging stroke of the arm so as to apply pressure on the magazine for moving it at least partially out of position in the carrier, and a bearing member mounted on said casing having an obliquely disposed face portion in position to have camming engagement with a portion of said arm structure for giving said arm an operative stroke for releasing said magazine upon a backward movement of the carrier.

8. In a magazine type motion picture camera, the combination of a casing, lens means operatively mounted in said casing, a magazine carrier movable in said casing toward and from said lens means for gripping a magazine and moving it into and out of operative position with respect to said lens means, an arm pivotally mounted on said carrier in position to engage said magazine upon an operative swinging stroke of the arm so as to apply pressure on the magazine for releasing it from the grip of the carrier, a second arm pivotally mounted on said casing and having and obliquely disposed face portion in position to have a camming engagement with a portion of said first-named arm structure for giving said first-named arm an operative stroke for releasing said magazine upon a backward movement of the carrier, and yielding means for returning said last-named arm to its normal retracted position when it has been displaced forwardly for clearing its engagement with said first-named arm structure.

9. In a magazine type motion picture camera, the combination of a casing, lens means operatively mounted in said casing, a magazine carrier movable in said casing toward and from said lens means for gripping a magazine and moving it into and out of operative position with respect to said lens means, a post extending backwardly from said carrier, a sleeve rotatably mounted on said post, a pin extending transversely from said sleeve, an arm mounted on said sleeve and extending into position for engaging said magazine so as to apply pressure transversely thereon for releasing the magazine from the grip of the carrier, and a bearing member mounted on said casing having an obliquely disposed face portion in position to have a camming engagement with said pin for giving said sleeve and said arm a rocking movement about said post for releasing said magazine from the carrier when the carrier is moved backwardly.

THEODORE S. BRISKIN.
HELEN B. SPERRY,
*Executrix of the Estate of Philmore F. Sperry, Deceased.*